US008732356B2

(12) United States Patent
Kabakura

(10) Patent No.: US 8,732,356 B2

(45) Date of Patent: May 20, 2014

(54) STORAGE SYSTEM, AND ACCESS PATH STATE UPDATE METHOD

(75) Inventor: Masanori Kabakura, Tokyo (JP)

(73) Assignee: NEC Corporation, Tokyo (JP)

( * ) Notice: Subject to any disclaimer, the term of this patent is extended or adjusted under 35 U.S.C. 154(b) by 266 days.

(21) Appl. No.: 13/424,509

(22) Filed: Mar. 20, 2012

(65) Prior Publication Data

US 2012/0254482 A1 Oct. 4, 2012

(30) Foreign Application Priority Data

Mar. 31, 2011 (JP) ................................ 2011-077273

(51) Int. Cl.

*G06F 3/00* (2006.01)

(52) U.S. Cl.

USPC ................. 710/38; 710/36; 710/41; 711/100; 711/154; 370/229; 370/231; 370/232; 370/351

(58) Field of Classification Search

None

See application file for complete search history.

(56) References Cited

U.S. PATENT DOCUMENTS 6,434,637 B1 * 8/2002 D'Errico ......................... 710/38
6,542,944 B2 * 4/2003 D'Errico ......................... 710/38
7,155,558 B1 * 12/2006 Vaghani et al. ................... 711/4
7,269,683 B1 * 9/2007 Vaghani et al. ................... 711/4
7,404,005 B1 * 7/2008 Burton et al. ................. 709/238
7,603,507 B2 * 10/2009 Yagi et al. ..................... 710/316
7,656,806 B2 * 2/2010 Hinata et al. .................. 370/238
7,668,981 B1 * 2/2010 Nagineni et al. ................ 710/38
7,685,628 B2 * 3/2010 Fukui et al. ....................... 726/2
7,711,908 B2 * 5/2010 Satoyama et al. ............ 711/154
7,783,779 B1 * 8/2010 Scales et al. .................. 709/240
7,787,381 B2 * 8/2010 Small et al. ................... 370/237
7,865,767 B2 * 1/2011 Honda et al. ................... 714/6.3
7,957,398 B1 * 6/2011 Yochai et al. ............ 370/395.42
8,004,984 B2 * 8/2011 Shimizu et al. ............... 370/232

(Continued)

FOREIGN PATENT DOCUMENTS

EP 1847921 A2 * 10/2007
JP 2000-348005 12/2000
JP 2007-094681 4/2007
JP 2007-287064 11/2007

OTHER PUBLICATIONS

'EMC PowerPath Load Balancing and Failover' White Paper, Feb. 2011 by EMC Corporation, pp. 1-2, full document can be found at http://www.emc.com/collateral/software/white-papers/h8180-powerpath-load-balancing-failover-wp.pdf.*

(Continued)

*Primary Examiner* — Steven Snyder

(74) *Attorney, Agent, or Firm* — Young & Thompson

(57) ABSTRACT

A storage system includes: an access path management unit managing a state of each access path for each logical disk; an I/O speed calculation unit storing, for each of the access paths, a data size and required time obtained when an I/O is executed, and calculates an I/O speed for every calculation cycle; a path candidate selection unit selecting an access path in the available state as an I/O use candidate; and a path candidate exclusion unit which excludes access paths of which speed is slow from the candidates, using a highest speed value among the speed values of the access paths selected as candidates, and the access path management unit sequentially changes the states of the access paths, out of the remaining candidates, to the I/O use states, in order of the I/O speed from the fastest until the number of access paths reaches the maximum number of paths.

6 Claims, 15 Drawing Sheets

(56) References Cited

U.S. PATENT DOCUMENTS

| | | | | |
|---|---|---|---|---|
| 8,037,171 | B2 * | 10/2011 | Burton et al. | 709/224 |
| 8,037,257 | B2 * | 10/2011 | Sato et al. | 711/154 |
| 8,185,707 | B2 * | 5/2012 | Sato et al. | 711/154 |
| 8,223,652 | B2 * | 7/2012 | Hinata et al. | 370/238 |
| 8,244,934 | B2 * | 8/2012 | Veni et al. | 710/38 |
| 8,396,960 | B2 * | 3/2013 | Martinez et al. | 709/224 |
| 2002/0166005 | A1 * | 11/2002 | Errico | 710/38 |
| 2006/0143332 | A1 * | 6/2006 | Yagi et al. | 710/38 |
| 2006/0215552 | A1 * | 9/2006 | Iwata et al. | 370/229 |
| 2007/0094147 | A1 * | 4/2007 | Fukui et al. | 705/59 |
| 2007/0248017 | A1 * | 10/2007 | Hinata et al. | 370/238 |
| 2008/0205301 | A1 * | 8/2008 | Burton et al. | 370/254 |
| 2010/0161852 | A1 * | 6/2010 | Veni et al. | 710/38 |
| 2010/0198987 | A1 * | 8/2010 | Hinata et al. | 709/244 |
| 2012/0005327 | A1 * | 1/2012 | Sato et al. | 709/223 |
| 2012/0017121 | A1 * | 1/2012 | Carlson et al. | 714/43 |

OTHER PUBLICATIONS

'ETERNUS Multipath Driver V2 User's Guide,' copyright 2013 by Fujitsu Limited, pp. 1-3, full document can be found at http://storage-system.fujitsu.com/doc/pdf/p2ww-1451-en.pdf.*

'New Approaches to Routing for Large-Scale Data Networks,' a thesis by Johnny Chen, Jun. 1999.*

'SNIA Technical Position—Multipath Management API' version 1.1, copyright 2010 by Storage Networking Industry Association.*

* cited by examiner

FIG. 2

| ACCESS PATH LOAD STATE | | | | | | |
|---|---|---|---|---|---|---|
| ACCESS PATH IDENTIFIER | Read－I／O | | | Write－I／O | | |
| | SIZE | REQUIRED TIME | SPEED | SIZE | REQUIRED TIME | SPEED |
| PATH 1 | 1600MB | 2000ms | 800MB/sec | 1600MB | 4000ms | 400MB/sec |
| PATH 2 | 900MB | 1500ms | 600MB/sec | 900MB | 3000ms | 300MB/sec |
| PATH 3 | 200MB | 1000ms | 200MB/sec | 200MB | 2000ms | 100MB/sec |
| PATH 4 | 180MB | 1200ms | 150MB/sec | 80MB | 1000ms | 80MB/sec |

FIG. 3

| ACCESS PATH STATE | | | | | | | | |
|---|---|---|---|---|---|---|---|---|
| LOGICAL DISK IDENTIFIER | ACCESS PATH (1) | | ACCESS PATH (2) | | ACCESS PATH (3) | | ACCESS PATH (4) | |
| | IDENTIFIER | STATE | IDENTIFIER | STATE | IDENTIFIER | STATE | IDENTIFIER | STATE |
| LUN1 | PATH 1 | Read/Write | PATH 2 | Read | PATH 3 | Standby | PATH 4 | Failed |
| LUN2 | PATH 1 | Read/Write | PATH 2 | Write | PATH 3 | Standby | PATH 4 | Failed |

ACCESS PATH LIST

FIG. 4

| I/O LOAD DISTRIBUTION INFORMATION | | | | | |
|---|---|---|---|---|---|
| I/O SPEED UPDATE CYCLE | I/O ISSUE CYCLE | Read－I／O | | Write－I／O | |
| | | MAXIMUM NUMBER OF | SPEED THRESHOL | MAXIMUM NUMBER OF | SPEED THRESHOL |
| 600sec | 60sec | 2 | 60% | 1 | 100% |

FIG. 10

| ACCESS PATH LOAD STATE | | | | | | |
|---|---|---|---|---|---|---|
| ACCESS PATH IDENTIFIER | Read−I/O | | | Write−I/O | | |
| | SIZE | REQUIRED TIME | SPEED | SIZE | REQUIRED TIME | SPEED |
| PATH 1 | 2000MB | 2000ms | 1000MB/sec | 2000MB | 4000ms | 500MB/sec |
| PATH 2 | 1200MB | 1500ms | 800MB/sec | 1200MB | 3000ms | 400MB/sec |
| PATH 3 | 300MB | 1000ms | 300MB/sec | 500MB | 2000ms | 250MB/sec |
| PATH 4 | 240MB | 1200ms | 200MB/sec | 150MB | 1000ms | 150MB/sec |

FIG. 11

| ACCESS PATH STATE | | | | | | | | |
|---|---|---|---|---|---|---|---|---|
| LOGICAL DISK IDENTIFIER | ACCESS PATH (1) | | ACCESS PATH (2) | | ACCESS PATH (3) | | ACCESS PATH (4) | |
| | IDENTIFIER | STATE | IDENTIFIER | STATE | IDENTIFIER | STATE | IDENTIFIER | STATE |
| LUN1 | PATH 1 | Read/Write | PATH 2 | Standby | PATH 3 | Standby | PATH 4 | Standby |

FIG. 12

| I/O LOAD DISTRIBUTION INFORMATION | | | | | |
|---|---|---|---|---|---|
| I/O SPEED UPDATE CYCLE | I/O ISSUE CYCLE | Read−I/O | | Write−I/O | |
| | | MAXIMUM NUMBER OF | SPEED THRESHOL | MAXIMUM NUMBER OF | SPEED THRESHOL |
| 600sec | 60sec | 2 | 60% | 2 | 50% |

FIG. 13

| ACCESS PATH STATE | | | | | | | | |
|---|---|---|---|---|---|---|---|---|
| LOGICAL DISK IDENTIFIER | ACCESS PATH (1) | | ACCESS PATH (2) | | ACCESS PATH (3) | | ACCESS PATH (4) | |
| | IDENTIFIER | STATE | IDENTIFIER | STATE | IDENTIFIER | STATE | IDENTIFIER | STATE |
| LUN1 | PATH 1 | Read/Write | PATH 2 | Read/Write | PATH 3 | Standby | PATH 4 | Standby |

FIG. 14

| ACCESS PATH STATE | | | | | | | | |
|---|---|---|---|---|---|---|---|---|
| LOGICAL DISK IDENTIFIER | ACCESS PATH (1) | | ACCESS PATH (2) | | ACCESS PATH (3) | | ACCESS PATH (4) | |
| | IDENTIFIER | STATE | IDENTIFIER | STATE | IDENTIFIER | STATE | IDENTIFIER | STATE |
| LUN1 | PATH 1 | Failed | PATH 2 | Read/Write | PATH 3 | Standby | PATH 4 | Standby |

FIG. 15

| ACCESS PATH STATE | | | | | | | | |
|---|---|---|---|---|---|---|---|---|
| LOGICAL DISK IDENTIFIER | ACCESS PATH (1) | | ACCESS PATH (2) | | ACCESS PATH (3) | | ACCESS PATH (4) | |
| | IDENTIFIER | STATE | IDENTIFIER | STATE | IDENTIFIER | STATE | IDENTIFIER | STATE |
| LUN1 | PATH 1 | Failed | PATH 2 | Read/Write | PATH 3 | Write | PATH 4 | Standby |

STORAGE SYSTEM, AND ACCESS PATH STATE UPDATE METHOD

This application is based upon and claims the benefit of priority from Japanese patent application No. 2011-077273, filed on Mar. 3, 2011, the disclosure of which is incorporated herein in its entirety by reference.

BACKGROUND

The present invention relates to a storage system, and an access path state update method.

Availability can be improved in a storage system by making a plurality of access paths redundant, since even if one access path fails, the path can be switched to another access path and continue communication. Furthermore the I/O can be faster if a band is widened by using a plurality of access paths for an I/O.

Patent Publication JP-A-2000-348005 discloses a storage system which makes paths redundant using access paths having different characteristics. The system uses an SAN (Storage Area Network) as the I/O during normal time use, and uses a LAN (Local Area Network) when a failure occurs to the SAN. Patent Publication JP-A-2007-287064 discloses a storage system which determines an access path to be used, out of a plurality of access paths, according to the performance information and predefined policy. Further, Patent Publication JP-A-2007-94681 discloses a storage system which issues a license key for enabling a port that is not in use, according to the utilization factors of the access paths and occurrence of failure, and switches the current path to the enabled access path.

In the case of the system disclosed in Patent Publication JP-A-2000-348005, a SAN is used for the operating system, and a LAN is used for the standby system, an I/O is issued for only one of these, and the load conditions are not considered. In the case of the system disclosed in Patent Publication JP-A-2007-287064, an access path to be used can be determined by periodically checking the operation state of the access paths, but the quick handling of an occurrence of a failure is not considered. In the case of the system disclosed in Patent Publication JP-A-2007-94681, a management server for managing the license is essential, and processing to enable and disable the access paths is generated, which makes the configuration complicated.

SUMMARY

With the foregoing in view, it is an exemplary object of the present invention to provide a storage system, and an access path state update method, which can quickly switch the current access path to a more efficient access path according to the load state, occurrence of a failure or the like, using a simple configuration.

A storage system according to an exemplary aspect of the present invention comprises: a plurality of access paths which are set between a host computer and a storage device; an access path management unit which manages a state of each of the access paths independently for each logical disk formed on the storage device; an I/O speed calculation unit which stores, for each of the access paths, a data size and required time obtained when an I/O is executed using the access path, and calculates an I/O speed using the stored data size and required time, for every predetermined calculation cycle; a path candidate selection unit which selects, out of the access paths and as a candidate of the access path to be used for the I/O, to the logical disk, an access path of which access path state is set to an available state, when a condition to update the access path state is established; and a path candidate exclusion unit which calculates a performance determination threshold using a highest speed value among the I/O speed values corresponding to the access paths selected by the path candidate selection unit, and excludes the access paths of which I/O speed values are lower than the performance determination threshold from the candidates, wherein the access path management unit updates the states of the access paths by sequentially changing the states of the access paths, out of the candidates remaining after the exclusion by the path candidate exclusion unit, to the states of being available for the I/O to the logical disk, in order of the I/O speed from fastest until the number of access paths reaches the maximum number of paths which is set in advance.

An access path state update method according to an exemplary aspect of the present invention is a method for updating states of a plurality of access paths which are set between a host computer and a storage device, comprising the steps of: managing a state of each of the access paths independently for each logical disk formed on the storage device; storing, for each of the access paths, a data size and required time obtained when an I/O is executed using the access path, and calculating an I/O speed using the stored data size and required time, for every predetermined calculation cycle; selecting, out of the access paths and as a candidate of the access path to be used for the I/O to the logical disk, an access path of which access path state is set to an available state, when a condition to update the access path state is established; calculating a performance determination threshold using a highest speed value among the I/O speed values corresponding to the selected access paths, and excluding the access paths of which I/O speed values are lower than the performance determination threshold from the candidates; and updating the states of the access paths by sequentially changing the states of the access paths, out of the candidates remaining after the exclusion, to the states of being available for the I/O to the logical disk, in order of the I/O speed from fastest until the number of access paths reaches the maximum number of paths which is set in advance.

A recording medium storing a program of the present invention has a computer execute each step included in the access path state update method.

DESCRIPTION OF THE DRAWINGS

FIG. 2 shows an example of data configuration of the access path load state table;

FIG. 3 shows an example of data configuration of the access path state table;

FIG. 4 shows an example of data configuration of the I/O load distribution information table;

FIG. 10 shows an example of data stored in the access path load state table;

FIG. 11 shows an example of data stored in the access path state table;

FIG. 12 shows an example of data stored in the I/O load distribution information table;

FIG. 13 shows an example of data stored in the access path state table;

FIG. 14 shows an example of data stored in the access path state table; and

FIG. 15 shows an example of data stored in the access path state table.

EXEMPLARY EMBODIMENT

Preferred embodiments of a storage system, and an access path state update method according to the present invention will now be described with reference to the accompanying drawings.

Figure 1:
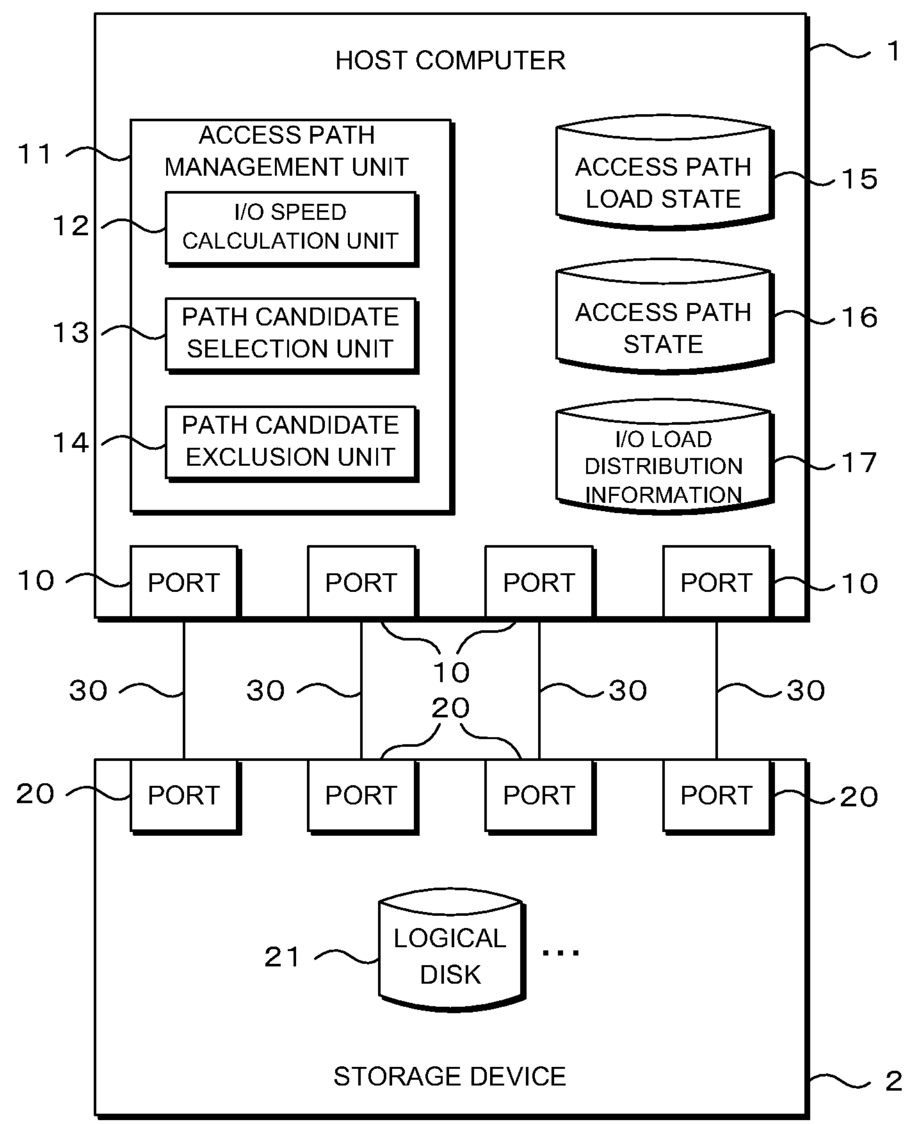
FIG. 1 is a block diagram depicting an example of a configuration of a storage system according to an embodiment.

First a configuration of a storage system according to an embodiment will be described with reference to FIG. 1. As FIG. 1 shows, the storage system has a host computer 1, and a storage device 2 for forming one or a plurality of logical disk(s) 21. The host computer 1 and the storage device 2 have a plurality of ports 10 and a plurality of ports 20 respectively. The host computer 1 and the storage device 2 are connected via the ports 10 and the ports 20 respectively. A path connecting the port 10 and the port 20 is called an "access path" 30.

Examples of a method for installing an access path 30 are a method of connecting from an FCHBA (Fiber Channel Host Bus Adapter) installed on the host computer 1 to an FC (Fiber Channel) port of the storage device 2 by an FC cable via an FC switch, based on the FC protocol, and a method of connecting with an IP (Internet Protocol) network based on the iSCSI (internet Small Computer System Interface) protocol.

A plurality of methods may be used to install the access paths 30. In concrete terms, an access path 30 is connected based on the FC protocol, and another access path 30 is connected based on the iSCSI protocol.

Here the host computer 1 physically includes a CPU (Central Processing Unit), a storage apparatus, and an input/output interface. The storage apparatus includes such elements as ROM (Read Only Memory) and HDD (Hard Disk Drive) for storing programs and data to be processed by the CPU, and RAM (Random Access Memory), which is primarily used for various work areas for control processing. These elements are interconnected via a bus. The later mentioned functions of each component in the host computer 1 can be implemented by the CPU executing the programs stored in ROM and the processing data developed in RAM.

The functional configuration of the host computer 1 will now be described with reference to FIG. 1. The host computer 1 functionally has an access path management unit 11, which includes an I/O speed calculation unit 12, a path candidate selection unit 13 and a path candidate exclusion unit 14, for example. The host computer 1 has an access path load state table 15, an access path state table 16 and an I/O load distribution information table 17, to which each component refers.

Now a data configuration of the access path load state table 15 will be described with reference to FIG. 2. As data items, the access path load state table has an access path identifier item, a size item, a required time item and a speed item. The size item, the required time item and the speed item are created for Read-I/O and Write-I/O respectively. The access path identifier item stores identification information for uniquely specifying an access path 30. The size item stores an accumulated value of the data size in Read-I/O or Write-I/O, which is generated at predetermined intervals. The required time item stores accumulated time of the required time for Read-I/O or Write-I/O, which is generated at predetermined intervals. The speed item stores the processing speed of Read-I/O or Write-I/O. The initial state of the access path load state table 15 is an empty table.

A data configuration of the access path state table 16 will be described next with reference to FIG. 3. As data items, the access path state table 16 has a logical disk identifier item, an access path identifier item, and an access path state item. The access path identifier item and the access path state item are created for each access path 30, constituting an access path list. The logical disk identifier item stores identification information for uniquely specifying a logical disk 21. The access path identification item stores identification information for uniquely specifying an access path 30. The access path state item stores the state of an access path 30. Examples of the state of an access path 30 that can be used here are: "Read" which is used only for reading, "Write" which is used only for writing, "Read/Write" which is used for both reading and writing, "Standby" which is not used for an I/O, but for a state where the access path is currently available, and "Failed" which is a state where a failure occurred and the access path cannot be used for the I/O. The initial state of the access path state table 16 is an empty table.

A data configuration of the I/O load distribution information table 17 will be described next with reference to FIG. 4. The I/O load distribution information table 17 has the following data items: an I/O speed update cycle item, an I/O issue cycle item, a maximum path item and a speed threshold item. The maximum path item and the speed threshold item are created for Read-I/O and Write-I/O respectively. The I/O speed update cycle item stores a cycle to update the speed item in the access path load state table 15. The I/O issue cycle item stores a cycle to issue an I/O. The maximum path item stores a maximum number of access paths 30 that can be used for Read-I/O and Write-I/O. The speed threshold item stores a ratio of the speed to the highest speed value, that is required to calculate the performance determination threshold for selecting a candidate of the access path 30. In the initial state of the I/O load distribution information table 17, values appropriate for an operation policy are set in each item in advance.

The I/O speed calculation unit 12 shown in FIG. 1 stores a data size and required time obtained when an I/O is executed using the access path 30 in the access path load state table 15, for each access path 30. The I/O speed calculation unit 12 calculates the I/O speed for each predetermined calculation cycle, using the data size and required time in the access path load state table 15, and stores the calculated speed in the access path load state table 15. An I/O includes Read-I/O and Write-I/O.

The path candidate selection unit 13 selects a candidate of the access path 30 to be used for an I/O to the logical disk 21, out of the access paths 30 when a condition to update the access path state managed by the access path state table 16 is satisfied.

Examples of the condition to update the access path state are: an increase/decrease of available access paths 30, a detection of failure in an access path 30, a recovery of an access path 30 from failure, and an update of I/O speed upon elapse of the I/O speed update cycle in the I/O load distribution information table 17.

When a candidate of the access path 30 is selected, the path candidate selection unit 13 selects an access path 30 of which access path state is set to an available state. Examples of available states are: "Read", "Write", "Read/Write" and "Standby". An example of an unavailable state is "Failed". This procedure will be described in concrete terms with reference to FIG. 3.

Candidates of an access path to the logical disk 21, of which logical disk identifier in FIG. 3 is "LUN1", are: "path 1" to "path 3", and "path 4", of which access path state is "Failed", is excluded. Candidates of an access path to the logical disk 21, of which logical disk identifier is "LUN2" are: "path 1" to "path 3", and "path 4", of which access path state is "Failed", is excluded.

The path candidate exclusion unit 14 calculates a performance determination threshold using the highest speed value out of the I/O speed values corresponding to the access paths 30 selected by the path candidate selection unit 13, and excludes an access path 30, of which I/O speed is slower than the performance determination threshold, from the candidates. This procedure will be described in concrete terms with reference to FIG. 2 and FIG. 4.

In the Read-I/O speed in FIG. 2, the speed of "path 1", "800 MB/sec" is the highest. The Read-I/O speed threshold in FIG. 4 is "60%". In this case, the path candidate exclusion unit 14 calculates "800 MB/sec"×"0.6"="480 MB/sec" as the performance determination threshold. If "path 1" to "path 3" in FIG. 2 are selected as the access path candidates, the path candidate exclusion unit 14 excludes "path 3", which is slower than "480 MB/sec", from the candidates.

The access path management unit 11 manages the access path state table 16, and manages the access paths 30 from the host computer 1 to the logical disks 21 of the storage device 2. The access path management unit 11 issues an I/O to the plurality of access paths 30, so as to implement load distribution.

Out of the candidates remaining after the exclusion by the path candidate exclusion unit 14, the access path management unit 11 updates the access path state to a state available for an I/O to the logical disk 21 in order of the I/O speed from fastest until the number of paths reaches the maximum number of paths which is set in advance. This procedure will be described in concrete terms with reference to FIG. 2 to FIG. 4.

For example, a case when "path 1" and "path 2" remain as access path candidates for Read-I/O to the logical disk 21, of which logical disk identifier is "LUN1", will be described. In this case, according to the speed values in FIG. 2, "path 1" is faster than "path 2". The maximum number of paths for Read-I/O is "2" in FIG. 4. Therefore the access path management unit 11 updates the access path state of "path 1" and the access state of "path 2", which are stored corresponding to the logical disk identifier "LUN1" in FIG. 3, to "Read".

If a failure is detected in an access path 30, the access path management unit 11 refers to the access path state table 16 using the access path identifier of the detected access path 30, and changes the access path state corresponding to this access path identifier to "Failed". Then a failover to another access path 30 becomes possible, and a redundancy of access paths is implemented.

If a recovery of an access path 30 from a failure is detected, the access path management unit 11 refers to the access path state table 16 using the access path identifier of the detected access path 30, and changes the access path state corresponding to this access path identifier to "Standby".

Now an operation of the storage system will be described.

Figure 5:
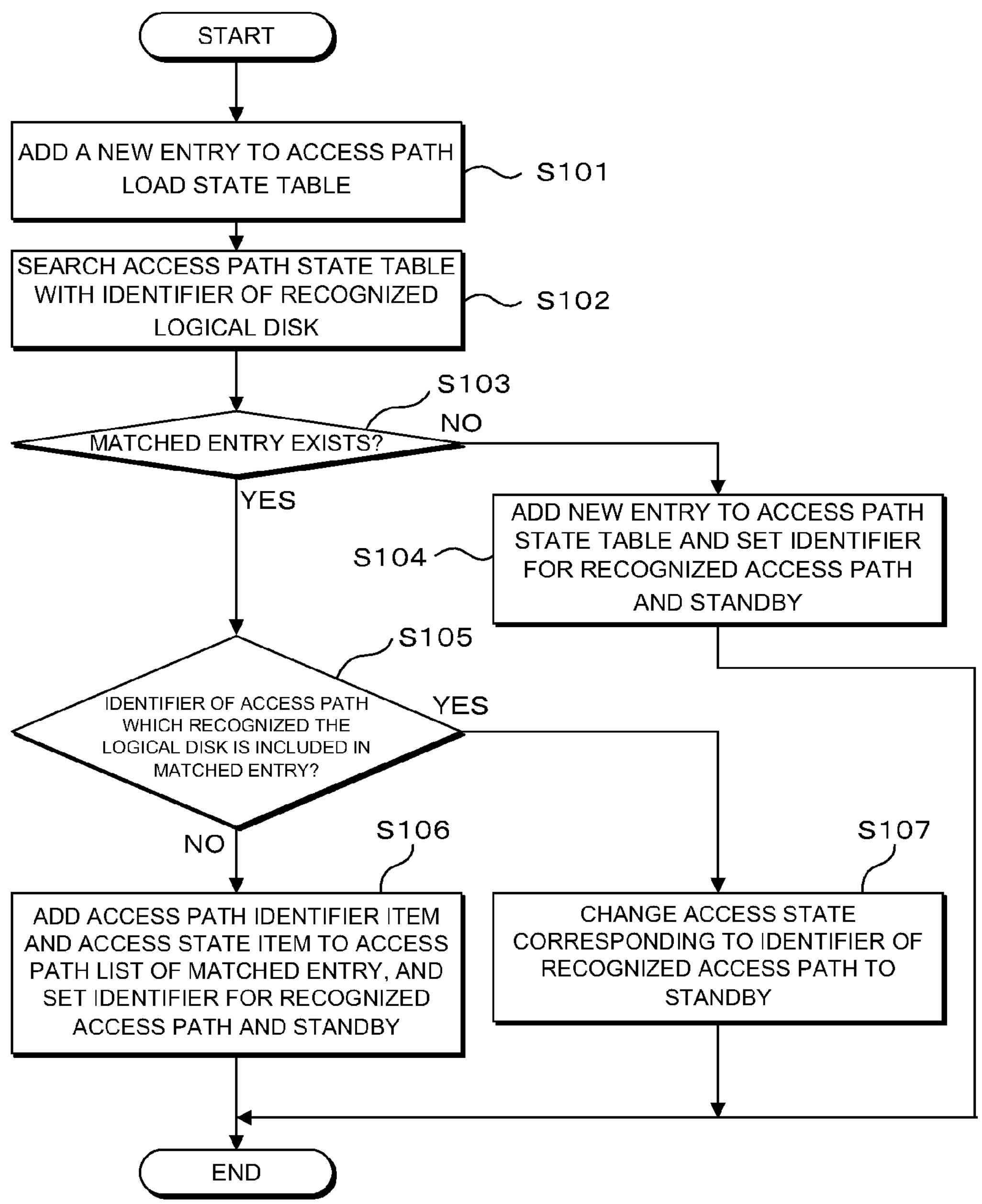
FIG. 5 is a flow chart depicting an operation to recognize the logical disk.

An operation when the access path management unit 11 recognizes a logical disk 21 will be described with reference to FIG. 5.

First the access path management unit 11 adds a new entry to the access path load state table 15, and stores the access path identifier of the access path 30, used when the logical disk 21 was recognized, in the access path identifier item (step S101).

Then using the logical disk identifier of the recognized logical disk 21, the access path management unit 11 searches for an entry having a logical disk identifier matching with this logical disk identifier in the access path state table 16 (step S102). If a matched entry does not exist in this search (step S103: NO), the access path management unit 11 adds a new entry to the access path state table 16, stores the logical disk identifier of the recognized logical disk 21 in the logical disk identifier item, stores the access path identifier of the access path 30 used when the logical disk 21 was recognized, in the access path identifier item, and stores "Standby" in the access path state item (step S104).

If a matched entry exists in the search in step S102 (step S102: YES), on the other hand, the access path management unit 11 determines whether the access path identifier stored in step S101 is included in the matched entry (step S105). If the result is NO (step S105: NO), the access path management unit 11 adds the access path identifier item and the access state item to the access path list of the matched entry, and stores the access path identifier of the access path 30 used when the logical disk 21 is recognized, and "Standby" in these items respectively (step S106).

If it is determined that the access path identifier is included in the matched entry of which access identifier is matched in the result of step S105 (step S105: YES), on the other hand, the access path management unit 11 changes the access state item corresponding to this access path identifier to "Standby" (step S107).

Figure 6:
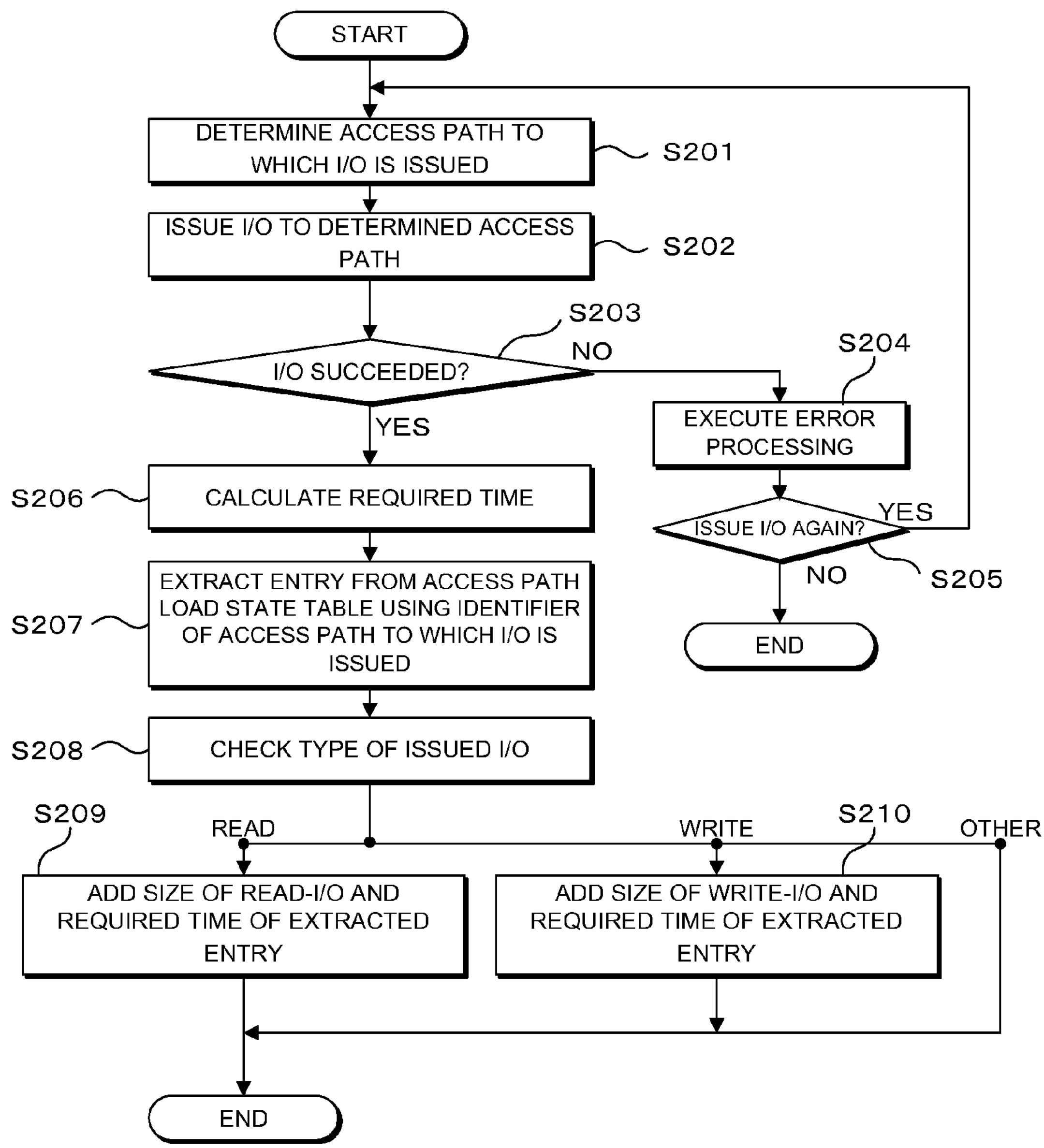
FIG. 6 is a flow chart depicting an operation to update a size item and a required time item of the access path load state table.

Now an operation when the access path management unit 11 updates the size item and required time item of the access path load state table 15 will be described with reference to FIG. 6.

When a request to issue an I/O to a logical disk 21 managed by the access path state table 16 is received, the access path management unit 11 determines an access path 30 to which the I/O is issued (step S201). Details on the procedure when the access path 30 is determined will be described later.

Then the access path management unit 11 records the I/O start time, and issues the I/O to the access path 30 determined in step S201 (Step S202).

Then the access path management unit 11 determines whether the processing status of the issued I/O is a success or not (step S203). If the result is NO (step S203: NO), the access path management unit 11 executes error processing (step S204). Examples of the error processing here are: reissuing the I/O to the same access path 30; closing this access path 30 to which the I/O was issued, assuming that a failure occurred to this access path 30, and resending the I/O to another access path 30; or returning an error to the source which requested issuing of the I/O.

If the I/O is issued again as a result of the error processing (step S205: YES), processing returns to step S201. If the I/O is not issued again (step S205: NO), this operation ends.

If it is determined that the processing status is a success in the result of step S203 (step S203: YES), on the other hand, then the access path management unit 11 calculates the required time of the I/O based on the current time and I/O start time (step S206).

Then the access path management unit 11 extracts an entry, matching with the access path identifier of the access path 30 to which the I/O was issued, from the access path load state table 15 (step S207).

Then the access path management unit 11 checks the type of the issued I/O (step S208). If the type of the I/O is "Read"

in the result of the check, the access path management unit 11 adds the data size of the issued I/O to the Read-I/O size of the entry extracted in step S206, and adds the required time of the I/O calculated in step S205 to the Read-I/O required time of this entry (step S209).

If the type of I/O is "Write" in the result of the check in step S208, the access path management unit 11 adds the data size of the issued I/O to the Write-I/O size of the entry extracted in step S206, and adds the required time of the I/O calculated in step S206 to the Write-I/O required time of this entry (step S210).

If the type of I/O is neither "Read" nor "Write" in the result of the check in step S208, on the other hand, then this operation ends.

In order to update the size and required time of an I/O, an I/O issue request is needed. This means that the size and required time of an I/O are not updated for an access path which is not used for an I/O and an access path to which an I/O is not issued. To prevent this state, the access path management unit 11 periodically issues an I/O for inspection. In concrete terms, the access path management unit 11 issues a Read-I/O and a Write-I/O for inspection at each I/O issue cycle of the I/O load distribution information table 17. Whereby a load state can be periodically updated for all the access paths.

The method for determining an access path 30 described in step S201 will be described next.

If an access path to which an I/O is issued is specified in advance, such as the above mentioned case of issuing an I/O for inspection, the specified access path is used for the I/O.

If an access path to which an I/O is issued is not specified in advance, on the other hand, it is determined whether the I/O to be issued is a Read-I/O or a Write-I/O.

If the I/O to be issued is a Read-I/O, an entry having a logical disk identifier matching with the logical disk identifier of the logical disk 21, to which the I/O is issued, is extracted from the access path state table 16. Then an access path, of which access path state is "Read/Write" or "Read", is selected from the access path list of the extracted entry, and is used for the I/O.

If the I/O to be issued is a Write-I/O, an entry having a logical disk identifier matching with the logical disk identifier of the logical disk 21, to which the I/O is issued, is extracted from the access path state table 16. Then an access path of which access path state is "Read/Write" or "Write" is selected from the access path list of the extracted entry, and is used for the I/O.

If the I/O to be used is neither "Read" nor "Write", then an access path to be used is determined in the same manner as the above mentioned I/O for read.

If a plurality of access paths are used, load is distributed among them. For the load distribution method, a round-robin method, where each access path is number and used in numerical order for each I/O, can be used, for example.

Figure 7:
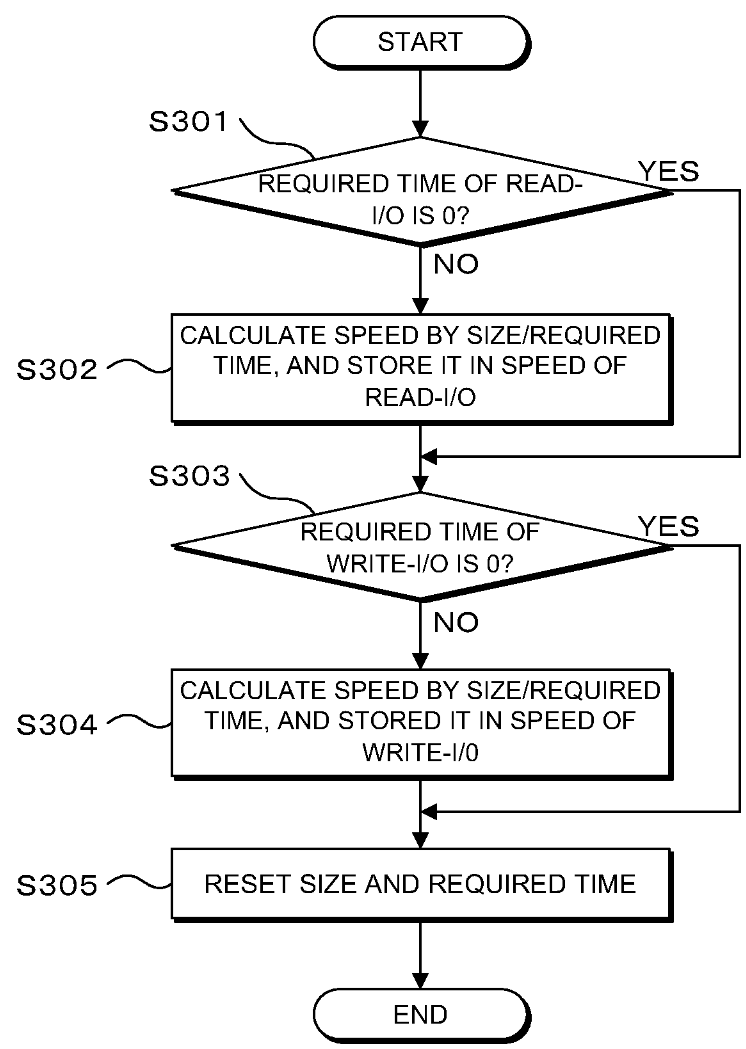
FIG. 7 is a flow chart depicting an operation to update a speed item of the access path load state table.

Now an operation of the access path management unit 11, updating the speed item of the access path load state table 15, will be described with reference to FIG. 7. The access path management unit 11 executes this operation for each I/O speed update cycle of the I/O load distribution information table 17. The access path management unit 11 executes each of the following processings repeatedly for all the entries of the access path load state table 15, that is, for all the access paths 30.

First the access path management unit 11 determines whether the required time of the Read-I/O of the target entry is "0" or not (step S301). If the result is YES (step S301: YES), the processing advances to step S303, which is described later.

If it is determined that the required time of Read-I/O is not "0" in step S301 (step S301: NO), on the other hand, the access path management unit 11 stores a value, generated by dividing the size of Read-I/O by the required time of Read-I/O, in the speed item of Read-I/O for an update (step S302).

Then the access path management unit 11 determines whether the required time of Write-I/O of the target entry is "0" or not (step S303). If the result is YES (step S303: YES), the processing advances to step S305, which is described later.

If it is determined that the required time of Write-I/O is not "0" in step S303 (step S303: NO), on the other hand, the access path management unit 11 stores a value, generated by dividing the size of Write-I/O by the required time of Write-I/O, in the speed item of Write-I/O for an update (step S304).

Then the access path management unit 11 resets the size and required time of Read-I/O and the size and required time of Write-I/O of the target entry to "0" respectively for an update (step S305).

By repeating the processing in the above steps S301 to S305 for all the entries of the access path load state table 15, the update of the I/O speed is completed.

Now an operation when the access path management unit 11 updates the access path state item of the access path state table 16 will be described with reference to FIG. 8 and FIG. 9. The access path management unit 11 starts this operation when conditions to update the access path state are established. The access path management unit 11 repeatedly executes each processing herein below for all the entries of the access path state table 16, that is, for all the logical disks 21.

First the access path management unit 11 selects all the access paths, other than those of which access path state is "Failed", out of the access paths 30 registered in the access path list of the target entry, as candidates of Read-I/O and Write-I/O respectively (step S401).

Then out of the access path load state table 15, the access path management unit 11 extracts all the entries having access path identifiers matching with the access path identifiers of the access paths selected as the candidates of Read-I/O in step S401 (step S402).

Then the access path management unit 11 compares the speed value of Read-I/O of each entry selected in step S402, and determines the highest speed value (step S403).

Then the access path management unit 11 multiplies the highest speed value determined in step S403 by the speed threshold of Read-I/O in the I/O load distribution information table 17, so as to calculate the performance determination threshold (step S404).

If there is a speed value that is less than the performance determination threshold calculated in step S404, among the speed values of Read-I/O of each entry extracted in step S402, the access path management unit 11 excludes the access path corresponding to this speed value from the candidates of Read-I/O (step S405).

Then the access path management unit 11 determines whether the number of remaining candidates of Read-I/O, after the exclusion in step S405, is greater than the maximum number of paths of Read-I/O in the I/O load distribution information table 17 (step S406). If the result is NO (step S406: NO), the processing advances to the later mentioned step S408.

If it is determined that the number of candidates of Read-I/O is greater than the maximum number of paths in step S406

(step S406: YES), on the other hand, the access path management unit 11 selects the candidates of Read-I/O in order of the Read-I/O speed from fastest until the number of access paths reaches the maximum number of paths, and excludes the rest from the candidates of Read-I/O (step S407).

Then the access path management unit 11 extracts, from the access path load state table 15, all the entries having the access path identifiers matching with the access path identifiers of access paths selected as the candidates of Write-I/O in step S401 (step S408).

Then the access path management unit 11 compares the speed value of Write-I/O of each entry extracted in step S408, and determines the highest speed value (step S409).

Then the access path management unit 11 multiplies the highest speed value determined in step S409 by the speed threshold of Write-I/O in the I/O load distribution information table 17, so as to calculate the performance determination threshold (step S410).

If there is a speed value that is less than the performance determination threshold calculated in step S410 among the speed values of Write-I/O in each entry extracted in step S408, the access path management unit 11 excludes the access path corresponding to this speed from the candidates of Write-I/O (step S411).

Then the access path management unit 11 determines whether the number of remaining candidates of Write-I/O after the exclusion in step S411 is greater than the maximum number of paths of Write-I/O in the I/O load distribution information table 17 (step S412). If the result is NO (step S412: NO), the processing advances to the later mentioned step S414.

If it is determined that the number of candidates of Write-I/O is greater than the maximum number of paths in step S412 (step S412: YES), on the other hand, the access path management unit 11 selects the candidates of Write-I/O in order of the Write-I/O speed from fastest until the number of access paths reaches the maximum number of paths, and excludes the rest from the candidates of Write-I/O (step S413).

Based on the candidates of Read-I/O remaining in step S407, and the candidates of Write-I/O remaining in step S413, the access path management unit 11 updates the states of access paths registered in the access path list of the target entry (step S414).

The states of the access paths after an update is as follows.

If an access path is selected as a candidate for both Read-I/O and Write-I/O, the access path state of this candidate is updated to “Read/Write”.

If an access path is selected as a candidate only for Read-I/O, the access path state of this candidate is updated to “Read”.

If an access path is selected as a candidate only for Write-I/O, the access path state of this candidate is updated to “Write”.

If an access path is not selected as a candidate for Read-I/O nor Write-I/O, the access path state of this access path is updated to “Standby”.

The processing in steps S401 to S414 are repeated for all the entries of the access path state table 16, whereby the update of the access path state is completed.

Figure 8:
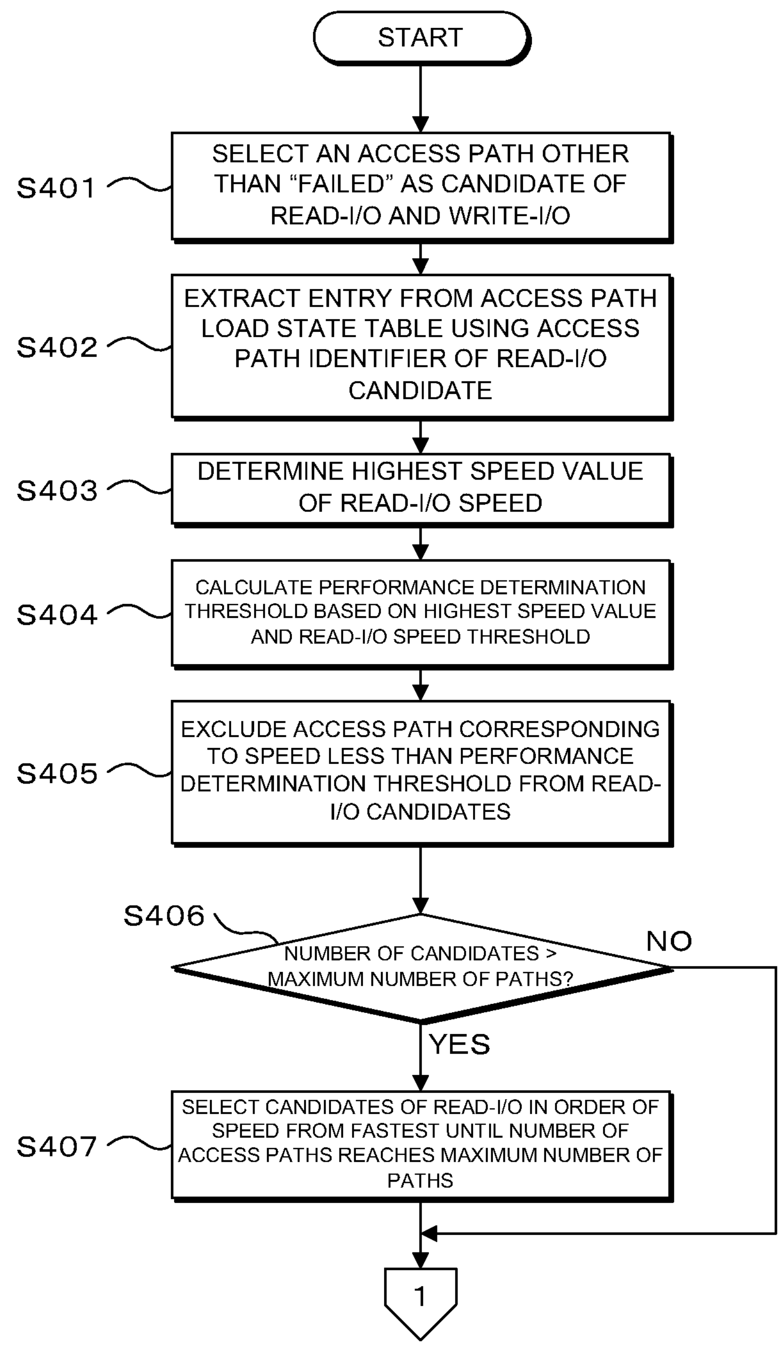
FIG. 8 is a flow chart depicting an operation to update an access path state item of the access path state table.
Figure 9:
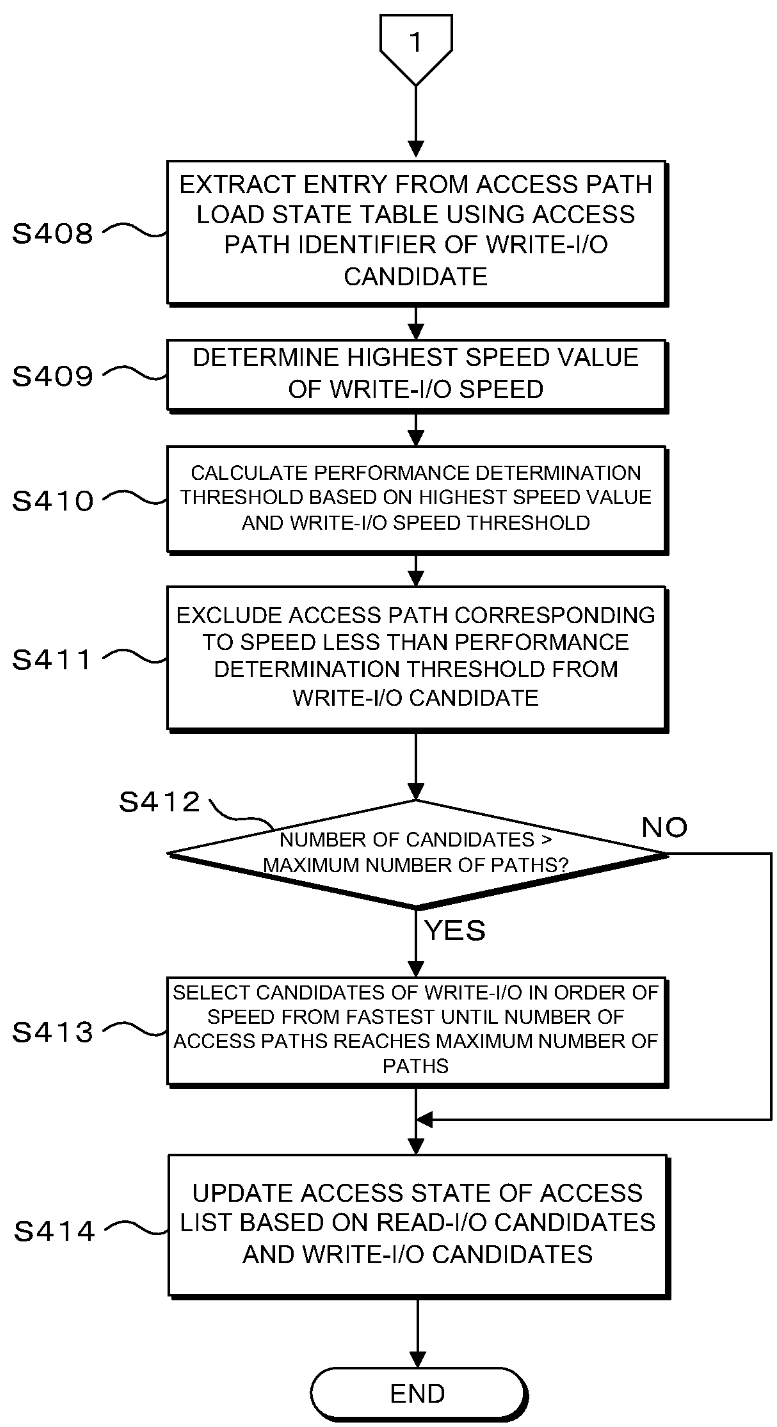
FIG. 9 is a flow chart depicting an operation to update an access path state item of the access path state table.

Now an operation when the access path state is updated as shown in FIG. 8 and FIG. 9 will be described using a concrete example.

This operation example is based on the following assumption. There are four access paths from the host computer 1 to the storage device 2, of which access path identifiers are “path 1”, “path 2”, “path 3” and “path 4” respectively. The “path 1” and “path 2” are access paths which are directly connected from the host computer 1 to the storage device 2, and “path 3” and “path 4” are access paths which are connected to the storage device 2 via a common network. The storage device 2 has a logical disk 21, of which logical disk identifier is “LUN1”.

FIG. 10 shows the content of the access path load state table 15 when this operation is started, FIG. 11 shows the content of the access path state table 16, and FIG. 12 shows the content of the I/O load distribution information table 17.

First candidates of Read-I/O and Write-I/O are selected in step S401. No access path state is “Failed” in the access path state table 16 in FIG. 11, so “path 1”, “path 2”, “path 3” and “path 4” are selected as candidates of Read-I/O and Write-I/O.

Then in step S403, the highest speed value of Read-I/O is determined. In the case of the access path load state table 15 in FIG. 10, “1000 MB/sec” of “path 1” is determined as the highest speed value.

Then in step S405, each access path of which speed value is less than the performance determination threshold of Read-I/O is excluded from the candidates of Read-I/O. In the case of the I/O load distribution information table 17 in FIG. 12, the speed threshold of Read-I/O is “60%”, and the highest speed value is “1000 MB/sec”, therefore the performance determination threshold is “600 MB/sec”. In the case of the access path load state table 15 in FIG. 10, the speed values of “path 3” and “path 4” are less than “600 MB/sec”, so “path 3” and “path 4” are excluded from the candidates of Read-I/O.

Then in step S406, the number of remaining candidates of Read-I/O is checked. In the case of the I/O load distribution information table 17 in FIG. 12, the maximum number of paths of Read-I/O is “2”, and the number of remaining candidates of Read-I/O is also “2”, so here candidates are not narrowed down.

Then in step S409, the highest speed value of Write-I/O is determined. In the case of the access path load state table 15 in FIG. 10, “500 MB/sec” of “path 1” is determined as the highest speed value.

Then in step S411, each access path of which speed value is less than the performance determination threshold of Write-I/O is excluded from the candidates of Write-I/O. In the case of the I/O load distribution information table 17 in FIG. 12, the speed threshold of Write-I/O is “50%”, and the highest speed value is “500 MB/sec”, therefore the performance determination threshold is “250 MB/sec”. In the case of the access path load state table 15 in FIG. 10, the speed value of “path 4” is less than “250 MB/sec”, so “path 4” is excluded from the candidates of Write-I/O.

Then in step S412, the number of remaining candidates of Write-I/O is checked. In the case of the I/O load distribution information table 17 in FIG. 12, the maximum number of paths of Write-I/O is “2”, and the number of remaining candidates of Write-I/O is “3”, so here candidates are narrowed down.

Then in step S413, the candidates of Write-I/O are narrowed down to be the maximum number of paths of Write-I/O in order of the Write-I/O from fastest. In the case of the access path load state table 15 in FIG. 10, the order of the Write-I/O speed from fastest is: “path 1”, “path 2” and “path 3”, therefore “path 3” is excluded from the candidates of Write-I/O. As a result, “path 1” and “path 2” remain as candidates of Write-I/O.

Then in step S414, the access path state registered in the access path list of the target entry is updated. In the case of this operation example, “path 1” and “path 2” are candidates for both Read-I/O and Write-I/O. FIG. 13 shows the content of the access path state table 16 after the update in this case. As FIG. 13 shows, the access path states of "path 1" and "path 2" are updated to "Read/Write", and the access path states of "path 3" and "path 4" are updated to "Standby".

Now a case of a failure occurring to "path 1" in the state of the access path state table 16 shown in FIG. 13 will be described. FIG. 14 shows the content of the access path state table 16 after the failure occurred.

As FIG. 14 shows, the access path state of "path 1" is updated to "Failed". Therefore "path 1" is excluded from the candidates of Read-I/O and Write-I/O.

In this case, the highest speed value of the Read-I/O is "800 MB/sec", and "path 3" and "path 4", of which speed values are less than "480 MB/sec", that is "60%" of "800 MB/sec", are excluded from the candidates of Read-I/O. Therefore only "path 2" is a candidate of Read-I/O.

The highest speed value of Write-I/O, on the other hand, is "400 MB/sec", and "path 4", of which speed value is less than "200 MB/sec", that is "50%" of "400 MB/sec", is excluded from the candidates of Write-I/O. Therefore "path 2" and "path 3" are candidates of Write-I/O.

FIG. 15 shows a content of the access path state table 16 in this case after the update. As FIG. 15 shows, the access path state of "path 1" is updated to "Failed", the access path state of "path 2" is updated to "Read/Write", the access path state of "path 3" is updated to "Write", and the access path state of "path 4" is updated to "Standby".

In other words, the state of using "path 1" and "path 2" for both Read-I/O and Write-I/O before failure is changed to the state of using only "path 2" for Read-I/O, and using both "path 2" and "path 3" for Write-I/O after failure.

As described above, according to the storage system of the present embodiment, the access path management unit 11 can determine the access paths to be used based on the load states of the access paths. Therefore in the storage system having a plurality of access paths of which load states of the I/O are different, performance characteristics based on speed can be determined, and the access paths to be used for an I/O can be efficiently determined according to the load distribution policy based on a maximum number of paths and speed threshold.

According to the storage system of the present embodiment, the access path management unit 11 can determine the load state based on the speed of the I/O. Therefore even if the band of the access path is shared by an apparatus outside the storage system, the load state can be determined.

According to the storage system of the present embodiment, the access management unit 11 can update the access path state at every predetermined interval, or every time the access path state changes. Therefore even if an access path is disconnected or if I/O performance drops, the access path can be switched to an appropriate access path.

Thus according to the storage system of the present embodiment, an access path can be quickly switched to a more efficient access path using a simple configuration, according to the load state, occurrence of a failure or the like.

[Variant Form]

The above described embodiment is merely an example, and the intent is not to exclude various modifications and application of technologies which are not explicitly stated in the embodiments. In other words, various modifications can be made without departing from the true spirit and scope of the invention.

For example, in the above mentioned embodiment, a case of using one storage device was described, but the present invention is not limited to this. The present invention can also be applied to a case of using a plurality of storage devices. In this case, an access path identifier and a logical disk identifier, which are unique in the storage system, are assigned, whereby this variant form can carry out the invention in the same manner as the above mentioned embodiment.

In the above mentioned embodiment, a case of using one host computer was described, but the present invention is not limited to this. The present invention can also be applied to a case of using a plurality of host computers. In this case, the access path management unit in each host computer manages the access paths connected to its own host computer. If an access path identifier, which is unique in the storage system, is assigned, the present invention can be carried out in the same manner as the above mentioned embodiment.

An exemplary advantage according to the present invention, the current access path can be quickly switched to a more efficient access path according to the load state, occurrence of a failure or the like, using a simple configuration.

The whole or part of the exemplary embodiments disclosed above can be described as, but not limited to, the following supplementary notes.

(Supplementary note 1) A storage system comprising: a plurality of access paths which are set between a host computer and a storage device; an access path management unit which manages a state of each of the access paths independently for each logical disk formed on the storage device; an I/O speed calculation unit which stores, for each of the access paths, a data size and required time obtained when an I/O is executed using the access path, and calculates an I/O speed using the stored data size and required time, for every predetermined calculation cycle; a path candidate selection unit which selects, out of the access paths and as a candidate of the access path to be used for the I/O to the logical disk, an access path of which access path state is set to an available state, when a condition to update the access path state is established; and a path candidate exclusion unit which calculates a performance determination threshold using a highest speed value among the I/O speed values corresponding to the access paths selected by the path candidate selection unit, and excludes the access paths of which I/O speed values are lower than the performance determination threshold from the candidates, wherein the access path management unit updates the states of the access paths by sequentially changing the states of the access paths, out of the candidates remaining after the exclusion by the path candidate exclusion unit, to the states of being available for the I/O to the logical disk, in order of the I/O speed from fastest until the number of access paths reaches the maximum number of paths which is set in advance.

(Supplementary note 2) The storage system according to Supplementary note 1, wherein when a failure is detected in the access path, the access path management unit changes the access path state corresponding to the access path in which the failure is detected, into an unavailable state.

(Supplementary note 3) The storage system according to Supplementary note 1 or 2, wherein the condition to update the states of the access paths includes an increase/decrease of the number of available access paths, detection of a failure in the access path, recovery of the access path from failure, and an elapse of a predetermined update cycle.

(Supplementary note 4) The storage system according to any one of Supplementary nots 1 to 3, wherein the I/O includes a Read-I/O and a Write-I/O.

(Supplementary note 5) An access path state update method for updating states of a plurality of access paths which are set between a host computer and a storage device, comprising the steps of: managing a state of each of the access paths independently for each logical disk formed on the storage device; storing, for each of the access paths, a data size and required time obtained when an I/O is executed using the access path, and calculating an I/O speed using the stored data size and required time, for every predetermined calculation cycle; selecting, out of the access paths and as a candidate of the access path to be used for the I/O to the logical disk, an access path of which access path state is set to an available state, when a condition to update the access path state is established; calculating a performance determination threshold using a highest speed value among the I/O speed values corresponding to the selected access paths, and excluding the access paths of which I/O speed values are lower than the performance determination threshold from the candidates; and updating the states of the access paths by sequentially changing the states of the access paths, out of the candidates remaining after the exclusion, to the states of being available for the I/O to the logical disk, in order of the I/O speed from fastest until the number of access paths reaches the maximum number of paths which is set in advance.

(Supplementary note 6) A recording medium storing a program for causing a computer to execute each step described in Supplementary note 5.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

I claim:

1. A storage system, comprising:

a plurality of access paths which are set between a host computer and a storage device;

an access path management unit which manages a state of each of the access paths independently for each logical disk formed on the storage device;

an I/O speed calculation unit which stores, for each of the access paths, a data size and required time obtained when an I/O is executed using the access path, and calculates an I/O speed using the stored data size and required time, for every predetermined calculation cycle;

a path candidate selection unit which selects, out of the access paths and as a candidate of the access path to be used for the I/O to the logical disk, an access path of which access path state is set to an available state, when a condition to update the access path state is established; and a path candidate exclusion unit which calculates a performance determination threshold using a highest speed value among the I/O speed values corresponding to the access paths selected by the path candidate selection unit, and excludes the access paths of which I/O speed values are lower than the performance determination threshold from the candidates, wherein the access path management unit updates the states of the access paths by sequentially changing the states of the access paths, out of the candidates remaining after the exclusion by the path candidate exclusion unit, to the states of being available for the I/O to the logical disk, in order of the I/O speed from fastest until the number of access paths reaches the maximum number of paths which is set in advance.

2. The storage system according to claim 1, wherein when a failure is detected in the access path, the access path management unit changes the access path state corresponding to the access path in which the failure is detected, into an unavailable state.

3. The storage system according to claim 1, wherein the condition to update the states of the access paths includes an increase/decrease of the number of available access paths, detection of a failure in the access path, recovery of the access path from failure, and an elapse of a predetermined update cycle.

4. The storage system according to claim 1, wherein the I/O includes a Read I/O and a Write I/O.

5. An access path state update method for updating states of a plurality of access paths which are set between a host computer and a storage device, comprising the steps of:

managing a state of each of the access paths independently for each logical disk formed on the storage device;

storing, for each of the access paths, a data size and required time obtained when an I/O is executed using the access path, and calculating an I/O speed using the stored data size and required time, for every predetermined calculation cycle;

selecting, out of the access paths and as a candidate of the access path to be used for the I/O to the logical disk, an access path of which access path state is set to an available state, when a condition to update the access path state is established;

calculating a performance determination threshold using a highest speed value among the I/O speed values corresponding to the selected access paths, and excluding the access paths of which I/O speed values are lower than the performance determination threshold from the candidates; and updating the states of the access paths by sequentially changing the states of the access paths, out of the candidates remaining after the exclusion, to the states of being available for the I/O to the logical disk, in order of the I/O speed from fastest until the number of access paths reaches the maximum number of paths which is set in advance.

6. A non-transitory recording medium storing a program for causing a computer to execute each step described in claim 5.

* * * * *